United States Patent
Isogawa et al.

(10) Patent No.: US 6,676,538 B2
(45) Date of Patent: Jan. 13, 2004

(54) GOLF BALL, AND GOLF BALL PRINTING INK

(75) Inventors: Kazuhiko Isogawa, Kobe (JP); Takashi Sasaki, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 144 days.

(21) Appl. No.: 09/918,635

(22) Filed: Aug. 1, 2001

(65) Prior Publication Data

US 2002/0045493 A1 Apr. 18, 2002

(30) Foreign Application Priority Data

Aug. 1, 2000 (JP) .......................... 2000-233471

(51) Int. Cl.⁷ .............................. A63B 37/12; C09C 1/66
(52) U.S. Cl. ................. 473/351; 473/353; 473/378; 473/385; 473/372; 40/327; 106/403; 106/404
(58) Field of Search ............... 106/403, 262, 106/266, 404; 473/378, 351, 370, 353, 372, 406, 385; 40/327; 523/160, 161

(56) References Cited

U.S. PATENT DOCUMENTS

| | | | | |
|---|---|---|---|---|
| 4,115,338 A | * | 9/1978 | Kobayashi et al. | 523/205 |
| 4,128,695 A | * | 12/1978 | Kikuchi et al. | 427/393.5 |
| 5,037,475 A | * | 8/1991 | Chida et al. | 106/262 |
| 5,332,767 A | * | 7/1994 | Reisser et al. | 428/403 |
| 5,357,008 A | * | 10/1994 | Tsai et al. | 525/504 |
| 5,542,680 A | * | 8/1996 | Proudfit et al. | 40/327 |
| 5,624,076 A | * | 4/1997 | Miekka et al. | 241/3 |
| 5,718,753 A | * | 2/1998 | Suzuki et al. | 106/403 |
| 5,814,686 A | * | 9/1998 | Micale et al. | 523/205 |
| 5,878,670 A | * | 3/1999 | Yamaguchi | 101/492 |
| 6,120,394 A | * | 9/2000 | Kametani | 101/492 |

FOREIGN PATENT DOCUMENTS

| | | |
|---|---|---|
| JP | 8-047551 | 2/1996 |
| JP | 11-114093 | 4/1999 |

* cited by examiner

*Primary Examiner*—Derris H. Banks
*Assistant Examiner*—Dmitry Suhol
(74) *Attorney, Agent, or Firm*—Birch, Stewart, Kolasch & Birch, LLP

(57) ABSTRACT

A golf ball bearing a mark having superior durability and glittering in a gold color is provided. The mark is obtained by printing with use of the ink having a resin and a metal powder including particles each having a main body of copper and a copper-zinc alloy portion on a surface of the main body. The preferable metal powder has a mean particle diameter of at most 50 μm.

18 Claims, 1 Drawing Sheet

- 2: GOLD - COLORED MARK
- 2a: RESIN
- 2b: METAL POWDER (EACH PARTICLE HAS A COPPER BODY AND A COPPER - ZINC ALLOY PORTION)
- 1: BALL BODY

- 2: GOLD - COLORED MARK
- 3: CLEAR FILM
- 1: BALL BODY

GOLF BALL, AND GOLF BALL PRINTING INK

BACKGROUND OF THE INVENTION

1. Field of the Invention

The present invention relates to a highly fashionable golf ball bearing a mark that glitters in a gold color and to an ink used for printing such a mark.

2. Description of the Related Art

Golf balls generally bear printed marks representing a brand name (or a trademark), a play number and the like on a surface thereof. Such marks have heretofore been black-colored to contrast with white balls.

In recent years, however, a golfer tends to prefer a fashionable golf ball and, hence, it is desired that marks of a brand name and the like printed on a surface of its ball body be colorful instead of being black-colored. Such colorful marks include chromatically colored marks containing pigments, and metallic-lustered marks. Recent golfers tend to prefer metallic-lustered marks to the chromatically colored ones.

As an example of a mark meeting such a demand, a mark having metallic luster printed with use of a metal powder-containing ink has been proposed (refer to Japanese Unexamined Patent Publication No. HEI 11-114093). The metal powder used in this ink comprises flat particles having an average thickness of 50 to 500 Å and a mean particle diameter of 10 to 60 $\mu$m, each of the particles having an embossed surface. The particles are made of a metal selected from the group consisting of aluminum, chromium, cobalt, steel, silver, gold and a nickel alloy.

A combination of a pigment and a metal powder is used in the ink disclosed in the Gazette mentioned above to develop a lustrous metallic color. Accordingly, if a gold-colored mark is desired, a powder comprising gold particles be used in the ink for providing the gold-colored mark. Use of the gold powder, however, increases the cost of the golf ball.

Japanese Unexamined Patent Publication No. HEI 8-47551 proposes a metallic-lustered mark formed by stacking a thermoplastic resin layer, a metal thin film and a surface-protective layer in this order. This mark further comprises a transparent colored layer between the metal thin film and the surface-protective layer. In a portion provided with the transparent colored layer, the color of the transparent colored layer appears to be brilliant by virtue of light reflected by the metal thin film.

With such a mark using a metal thin film, the metal thin film is merely affixed to the ball body surface through the thermoplastic resin layer and, hence, the adherence of the mark to the ball body surface is insufficient. The mark having such an insufficient adherence exhibits poor durability because it is likely to peel off or chip off as the ball is repeatedly hit with a club head.

SUMMARY OF THE INVENTION

It is an object of the present invention to provide a golf ball bearing a mark having superior durability and glittering in a gold color.

The golf ball of the present invention comprises a ball body and a gold-colored mark printed on a surface of the ball body. The gold-colored mark contains a resin and a metal powder including particles each having a main body of copper and a copper-zinc alloy portion on a surface of the main body.

The golf ball printing ink of the present invention comprises 100 parts of a resin, 15 to 500 parts of a metal powder including particles each having a main body of copper and a copper-zinc alloy portion on a surface of the main body, 100 to 250 parts of a solvent, and at most 25 parts of a coloring pigment.

The foregoing and other objects, features and attendant advantages of the present invention will become apparent from the reading of the following detailed description.

DETAILED DESCRIPTION OF THE PREFERRED EMBODIMENTS

The golf ball of the present invention comprises a ball body 1, and a gold-colored mark 2 printed on a surface of the ball body 1, the mark being formed of a material containing a resin 2a and a metal powder 2b including particles each having a main body of copper and a copper-zinc alloy portion on a surface of the main body.

Figure 1:
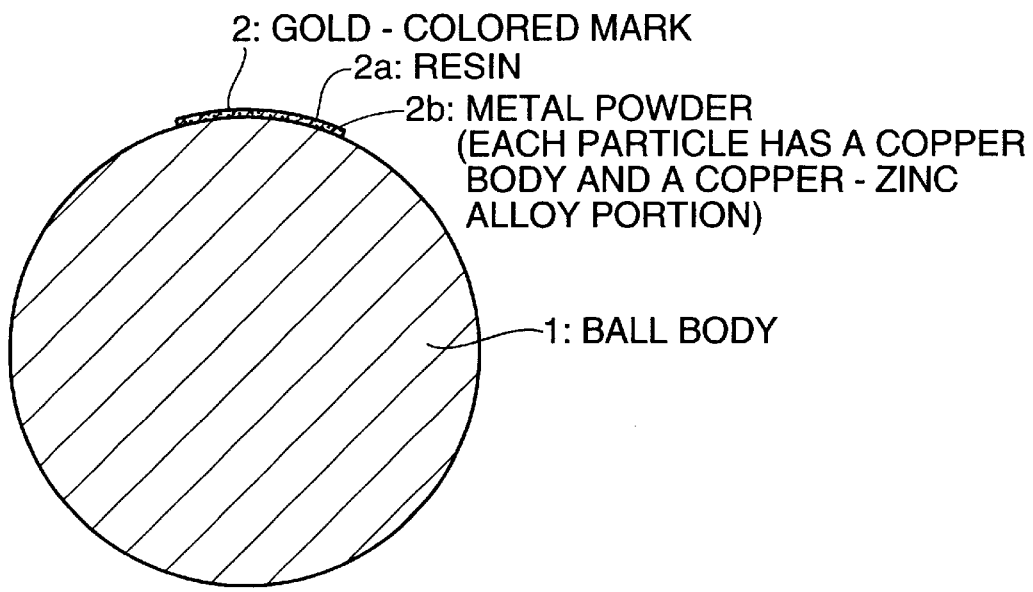
FIG. 1 is a cross-sectional view of the golf ball of this invention.
Figure 2:
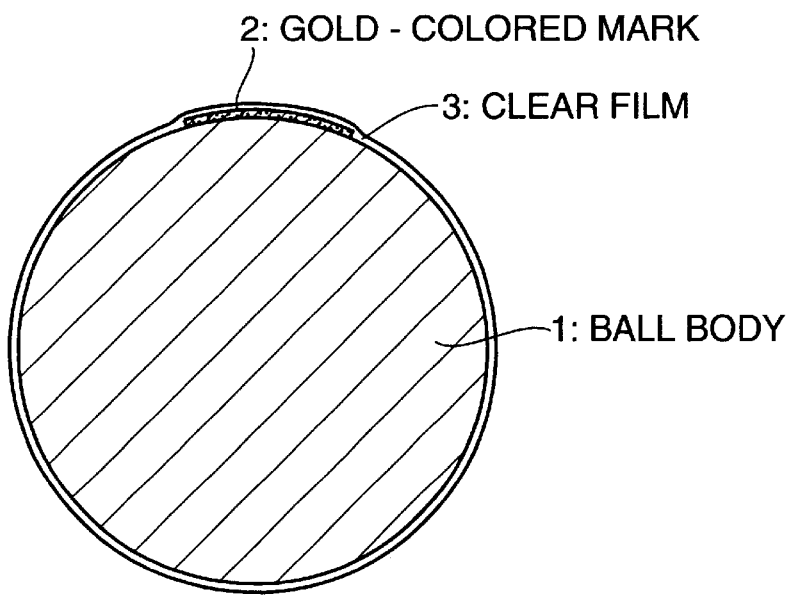
FIG. 2 is a cross-sectional view of another golf ball of this invention.

As is shown in FIG. 2, a clear film 3 may cover over the ball body 1 and the mark 2.

Inks for use in printing the mark of the golf ball of the present invention will be described first.

It is possible to use any ink containing a resin, and a metal powder including particles each having a main body of copper and a copper-zinc alloy portion on a surface of the main body. Particularly it is preferred to use the ink of the present invention. The ink comprises the above-mentioned metal powder, a resin as a vehicle, a solvent, and a coloring pigment optionally added to the ink in an amount such as not to influence the gold color of an intended mark.

The metal powder including particles each having a main body of copper and a copper-zinc alloy portion on a surface of the main body. The copper-zinc alloy portion means a brass layer or a brass part formed on a surface of the main body and makes the particles appearing a vivid gold color. Particles of other metals such as aluminum, steel, cobalt, nickel and silver provide not a gold-colored powder but white to gray or silver-colored powders. A copper powder, which includes particles each having a main body of copper and no brass portion on a surface of the main body, displays not a gold color but a reddish color.

The metal powder having a main body of copper and a copper-zinc alloy portion on a copper body surface (hereinafter referred to as "gold-colored powder" simply as the case may be) displays a more vivid gold color as its average water surface covering area increases. The average water surface covering area of the copper powder is preferably not less than 3,000 cm$^2$/g. The term "average water surface covering area" herein used means the surface area of a powder per 1 g.

The gold-colored powder preferably has a mean particle diameter of 50 $\mu$m or less, more preferably 45 $\mu$m or less, furthermore preferably 40 $\mu$m or less. This is because as the particle diameter of the gold-colored powder increases, the adherence of the ink to the ball body lowers and, hence, the durability of a resulting mark lowers. With decreasing particle diameter, the spacing between adjacent particles of the gold-colored powder present in a printed mark becomes reduced and, hence, the opacifying power of the gold-colored powder is enhanced, resulting in the mark exhibiting improved brightness. In terms of the adherence of the ink and the brightness of a resulting mark, the gold-colored powder preferably has a smaller particle diameter. With a smaller particle diameter, however, the gold-colored powder becomes more expensive because the production thereof becomes more difficult. In view of this, the gold-colored powder preferably has a mean particle diameter of 3 $\mu$m or more.

Any process for producing the gold-colored powder may be employed without any particular limitation. Examples of such processes include a dry process and a wet process. The dry process comprises cutting and grinding a copper mass formed into an ingot, and powdering the ground copper together with a zinc powder using a stamp ball mill thereby causing the zinc powder to adhere to a surface of the particle of the copper powder while forming an copper-zinc alloy on a surface of the copper particle. The wet process comprises zinc plating performed by dipping a copper particles into a zinc plating solution to produce brass on the surfaces of the copper particles.

Incidentally, though the production of a fine gold powder including particles made of gold is easy, it is needless to say that gold itself is an expensive metal and, hence, the use of the gold powder in an ink for printing a mark on a golf ball is not practical.

Examples of resins for use in the ink include vinyl resins, such as a vinyl chloride-vinyl acetate-vinyl alcohol copolymer, urethane resins, epoxy resins, polyester resins, acrylic resins, polyethylene-imine resins, polyester resins, and cellulosic resins.

The content ratio of the gold-colored powder to the resin (gold-colored powder/resin) in the ink is preferably not less than 0.15, more preferably not less than 0.2, furthermore preferably not less than 0.25. The upper limit of this ratio is preferably 5.0, more preferably 4.0, furthermore preferably 2.50. If the ratio is less than 0.15, which means that the content of the gold-colored powder is too low, a resulting mark has insufficient metallic luster and hence cannot satisfy the requirement of improved appearance. If it is more than 5.0, on the other hand, a resulting printed mark has reduced mark strength as well as lowered adherence to the ball body.

In the case of a two-part curing type resin comprising a base resin and a curing agent, the amount of the resin is the total amount of the base resin and the curing agent.

Any solvent which can homogeneously disperse and dissolve the resin therein can be used in the ink of the present invention. Examples of specific solvents include aromatic hydrocarbons such as toluene; ester solvents such as methoxybutyl acetate; ether solvents such as methyl ethyl ether; and ketone solvents such as methyl ethyl ketone and cyclohexanone.

The amount of the solvent in the ink is appropriately selected depending upon the amounts of the resin and the gold-colored powder so that the resin and the gold-colored powder can be homogeneously dispersed in the ink. The amount of the solvent is preferably 10 to 150 parts by mass, more preferably 20 to 120 parts by mass, furthermore preferably 30 to 100 parts by mass based on 100 parts by mass of the total amount of the gold-colored powder and the resin. Since the resin greatly influences the viscosity of the ink, it is preferred that the amount of the solvent be appropriately selected depending on the amount of the resin. If the amount of the solvent is too small relative to the amount of the resin, the ink has too high a viscosity and hence exhibits lower transferability from a pad, with the result that an incomplete mark may be printed by the pad printing technique. If the amount of the solvent is too large relative to the amount of the resin, the resulting mark may become blurred or require a longer drying time, causing the productivity to lower.

The ink of the present invention may contain a coloring pigment in an amount within such a range as not impair the gold color provided by the gold-colored powder which can impart a mark with a vivid gold color. In the case where such a coloring pigment is contained in the ink, the content ratio of the coloring pigment to the gold-colored powder (pigment/gold-colored powder) is usually not more than 0.25, preferably not more than 0.2. This is because the coloring pigment used in too large an amount makes the color of the pigment predominant and hence makes the development of a vivid gold color difficult.

The ratio of the total content of the gold-colored powder and the pigment to the content of the resin [(gold-colored powder+pigment)/resin] is preferably not less than 0.15, more preferably not less than 0.2, furthermore preferably not less than 0.25. The upper limit of this ratio is preferably 5.0, more preferably 4.0, furthermore preferably 3.0. If the ratio is less than 0.15, a resulting mark is lusterless, while if it is more than 5.0, a resulting mark has inferior durability.

Coloring pigments usable in the ink of the present invention may be either inorganic ones or organic ones.

Examples of specific inorganic coloring agents include red pigments such as red oxide ($Fe_2O_3$), red lead oxide ($Pb_3O_4$), molybdenum red, and cadmium red; yellow pigments such as titanium yellow ($20TiO_2$—$NiO$—$Sb_2O_3$), litharge (PbO), chrome yellow ($PbCrO_4$), yellow oxide (FeO(OH)), and cadmium yellow; blue pigments such as cobalt blue ($CoO \cdot Al_2O_3$), Prussian blue, and ultramarine blue; orange pigments such as chrome orange, molybdenum orange, and permanent orange GTR; violet pigments such as manganese violet; green pigments such as chrome green and chrome oxide; and white pigments such as zinc white, titanium oxide, antimony white, zinc sulfide, baryte powder, barium carbonate, clay, silica, white carbon, talc, and alumina white.

Examples of the organic coloring agents include azo pigments or azo dyes, phthalocyanine pigments, perylene pigments, indanthrene dyes, and dioxane dyes. Examples of specific azo pigments or azo dyes include monoazo compounds, bisazo compounds, trisazo compounds, and azoic dyes.

In the case where the resin contained in the ink as an indispensable component is of the type of which curing is accelerated in the presence of a curing agent, the ink of the present invention may contain such a curing agent. As the curing agent, an isocyanate is preferably used.

Examples of the isocyanates include hexamethylene diisocyanate, xylylene diisocyanate, tetramethylxylylene diisocyanate, tolylene diisocyanate, and hydrogenated diphenyl diisocyanate.

The content ratio of the curing agent to the base resin (curing agent/base resin) is preferably not less than 0.05 and not more than 1.0, more preferably not less than 0.07, furthermore preferably not less than 0.1. If this ratio is less than 0.05, a resulting mark has lower durability because the amount of the curing agent contained is insufficient. If it is more than 1.0, on the other hand, the curing reaction proceed so rapidly that the pot life of the composition is shortened, resulting in lowered workability.

As required, the ink of the present invention may contain additives, such as a flatting agent, plasticizer and filler, in addition to the aforementioned components (gold-colored powder, resin, solvent, coloring pigment, and curing agent). When the ink contains such additives, the ratio of the total amount of the resin, metal powder, coloring pigment and solvent to the amount of the overall ink is preferably adjusted to 0.8 or more, more preferably 0.9 or more, furthermore preferably 0.95 or more.

The golf ball of the present invention bears a mark printed on a surface of its ball body with the ink of the composition described above.

The term "mark" herein used is meant to include letters representing a brand name or an owner's name, pictures, numerals such as a play number, or the like.

Such a mark may be printed by any printing method without any particular limitation. Examples of such printing methods include a method employing a transfer foil, and a method using a pad.

According to the present invention, the entire ball body surface is usually coated with a clear paint after the mark has been printed thereon in order to protect the mark and enhance the gloss of the entire golf ball surface. A urethane paint is preferably used as the clear paint.

The golf ball of the present invention is any golf ball bearing a mark satisfying the foregoing requirements. Accordingly, any type of ball body can be used in the golf ball of the present invention. Examples of such golf ball bodies include: a one-piece golf ball body comprising a molded vulcanizate of a butadiene rubber, isoprene rubber or a like rubber; a multi-piece golf ball body comprising a core made of a vulcanized rubber or an elastomer, and a cover made from an elastomer, a resin or the like and covering the core; and a wound-core golf ball body comprising a wound core formed by winding rubber thread around a liquid center or a solid center, and a cover made from an elastomer, a resin or the like and covering the core.

EXAMPLES

The present invention will be specifically described by way of examples, which are, in no way, construed limitative of the present invention.

Measurement and Evaluation Methods
1. Durability of Mark

The durability of each mark was evaluated from two viewpoints, i.e., impact resistance and scuff resistance.

a) Impact Resistance

Using a swing robot (manufactured by Truetemper Co.) attached with a #1 wood club, each ball was hit 200 times repeatedly at a head speed of 45 m/sec. The mark of each ball was evaluated as to the degree of peeling according to the following rating criteria:

Category "⊚" represents a mark not peeled;
Category "○" represents a mark with a peeled portion having a length of less than 1 mm;
Category "Δ" represents a mark with a peeled portion having a length of 1 mm to 2 mm; and
Category "×" represents a mark with a peeled portion having a length of more than 2 mm.

b) Scuff Resistance

Using the above robot attached with a sand wedge, a bunker shot was performed 50 times. Each mark thus subjected to bunker shots was evaluated as to the degree of peeling according to the following rating criteria:

Category "⊚" represents a mark with no chip or scuff due to abrasion;
Category "○" represents a mark with a chip or scuff having a length of less than 1 mm;
Category "Δ" represents a mark with a chip or scuff having a length of 1 mm to 2 mm; and
Category "×" represents a mark with a chip or scuff having a length of more than 2 mm.

2. Glitter

The mark of each ball with a clear coat was visually observed to check the degree of golden sheen thereof. The degree to which each mark glittered in a gold color was rated into the following three ranks:

Category "○" represents a mark glittering in a vivid gold color;
Category "Δ" represents a mark gold-colored but with less glittering; and
Category "×" represents a mark having a certain degree of luster in a color other than gold.

Manufacture of Golf Ball
1. Preparation of Ink

A metal powder, a pigment and a curing agent were added to a medium ink (epoxy resin/additive/solvent=43/1/56 in mass ratio; trade name: "PAD-EPH" produced by Nabitas Co.), to prepare inks Nos. 1 to 9.

Three types of gold-colored powders "a" to "c" were used in inks Nos. 1 to 7. The powder "a" has a mean particle diameter of 7 μm; the powder "b" has a mean particle diameter of 40 μm; and the powder "c" has a mean particle diameter of 60 μm.

An aluminum powder comprising flat particles having a mean particle diameter of 11 μm was used as the metal powder in inks Nos. 8 and 9. A condensed azo pigment red was used in ink No. 8.

Additives contained in the medium ink named "PAD-EPH" include a flatting agent, which forms a major part of the additives. The solvent used in the ink is a mixture of methoxymethylbutyl acetate and an aromatic hydrocarbon.

2. Printing of Mark

The surface of a two-piece golf ball comprising a rubber core and an ionomer cover covering the core was subjected to a sandblasting treatment, and then a mark was printed on the golf ball surface by pad printing with use of an ink of the composition shown in Table 1. After the printing, a clear paint was applied onto the golf ball so as to cover the mark thus printed and the overall golf ball body. In this case, a urethane paint was used as the clear paint.

TABLE 1

| | No. | 1 | 2 | 3 | 4 | 5 | 6 | 7 | 8 | 9 |
|---|---|---|---|---|---|---|---|---|---|---|
| Ingredients (part(s)) | | | | | | | | | | |
| Metal Powder (M) | gold-colored "a" | 50 | — | — | 30 | 10 | 70 | 90 | — | — |
| | gold-colored "b" | — | 50 | — | — | — | — | — | — | — |
| | gold-colored "c" | — | — | 50 | — | — | — | — | — | — |
| | Aluminum | — | — | — | — | — | — | — | 20 | 50 |
| Epoxy resin (P) | | 50 | 50 | 50 | 70 | 90 | 30 | 10 | 70 | 50 |
| Condensed azo pigment | | — | — | — | — | — | — | — | 10 | — |
| Solvent | | 80 | 80 | 80 | 90 | 100 | 60 | 40 | 90 | 80 |

TABLE 1-continued

| No. | 1 | 2 | 3 | 4 | 5 | 6 | 7 | 8 | 9 |
|---|---|---|---|---|---|---|---|---|---|
| Curing agent (Q) | 10 | 10 | 10 | 10 | 10 | 10 | 10 | 10 | 10 |
| Additives | 4 | 4 | 4 | 4 | 4 | 4 | 4 | 4 | 4 |
| M/(P + Q) | 0.83 | 0.83 | 0.83 | 0.38 | 0.10 | 1.75 | 10.0 | 0.25 | 0.83 |
| Q/P | 0.20 | 0.20 | 0.20 | 0.14 | 0.11 | 0.33 | 1.00 | 0.14 | 0.20 |
| Evaluation | | | | | | | | | |
| Impact resistance | ⊚ | ⊚ | ○ | ⊚ | ⊚ | ○ | Δ | ○ | ○ |
| Scuff resistance | ⊚ | ⊚ | Δ | ⊚ | ⊚ | ○ | Δ | ○ | ○ |
| Glitter | ○ | ○ | ○ | ○ | Δ | ○ | ○ | X | X |

Golf balls Nos. 1 to 7 each bore a mark printed on the ball bodies using each ink containing the gold-colored powder. Any one of the marks printed on these golf balls displayed a gold color. In contrast, each of the marks formed using each ink containing the aluminum powder as the metal powder was in a reddish color (No. 8) originating from the pigment used or in a grayish color (No. 9), although it was observed to be lustrous.

As can be understood from comparison among golf balls Nos. 1 to 3, a mark has lower durability as the particle diameter of the gold-colored powder increases (refer to golf ball No. 3).

As can be understood from comparison among golf balls Nos. 1 and 4 to 7, when the proportion of the metal powder used in an ink is too small, more specifically, when the content ratio of the content of the metal powder (M)/the resin (P+Q) is less than 0.15, the golden luster or glitter of a resulting mark is insufficient (refer to golf ball No. 5). On the other hand, when the proportion of the metal powder used in an ink is too large, more specifically, when the content ratio of the metal powder (M)/the resin (P+Q) is more than 2.5, the ink exhibits decreased adherence though any practical problem does not arise. When the ratio is more than 5, the ink exhibits further decreased adherence, resulting in a mark having lowered durability (refer to golf balls Nos. 6 and 7).

The golf ball bearing a printed mark glittering in a gold color according to the present invention can meet the recent demand for improved appearance. The ink containing a specific metal powder instead of an expensive gold powder according to the present invention exhibits superior adherence to a golf ball body and, hence, a mark printed with the ink on a golf ball, which is subject to repeated deformations caused by shots, exhibits superior durability.

This application is based on Japanese Application Serial No.2000-233471 filed in Japanese Patent Office on Aug. 1, 2000, the contents of which are hereby incorporated by reference.

While only certain presently preferred embodiments of the present invention have been described in detail, as will be apparent for those skilled in the art, certain changes and modifications may be made in embodiment without departing from the spirit and scope of the present invention as defined by the following claims.

What is claimed is:

1. A golf ball comprising:
   a ball body, and
   a gold-colored mark printed on a surface of the ball body, wherein the mark contains an epoxy resin as a base resin and a metal powder including particles each having a main body of copper and a copper-zinc alloy portion on a surface of the main body.

2. A golf ball according to claim 1, wherein the content ratio of the powder (parts by mass) to the resin (parts by mass) is in the range of 0.15 to 5.0.

3. The golf ball according to claim 2, wherein said content ratio is 0.2 to 4.0.

4. A golf ball according to claim 1, wherein the metal powder has a mean particle diameter of at most 50 μm.

5. The golf ball according to claim 4, wherein said mean particle diameter of the metal powder is 40 μm or less.

6. The golf ball according to claim 4, wherein said mean particle diameter of the metal powder is 3 μm or more.

7. A golf ball according to claim 1, wherein the mark further contains a coloring pigment.

8. A golf ball according to claim 1, wherein the resin is cured with an isocyanate compound.

9. A golf ball according to claim 1, further comprising a clear film covering over the ball body and the mark.

10. The golf ball according to claim 9, wherein said clear film is a urethane paint.

11. The golf ball according to claim 1, wherein said ball body is a one-piece golf ball body.

12. The golf ball according to claim 1, wherein said ball body is a multi-piece golf ball body comprising a core and a cover.

13. The golf ball according to claim 1, wherein said ball body is a wound-core golf ball body comprising a wound core.

14. A golf ball printing ink comprising:
   100 parts by mass of an epoxy resin as a base resin;
   15 to 500 parts by mass of a metal powder including particles each having a main body of copper and a copper-zinc alloy portion on a surface of the main body;
   100 to 250 parts by mass of a solvent; and
   at most 25 parts by mass of a coloring pigment.

15. A golf ball printing ink according to claim 14, further comprising a curing agent, the content ratio of the curing agent to the resin being in the range of 0.05 to 1.0.

16. The golf ball printing ink according to claim 14, further comprising an additive.

17. A golf ball comprising:
   a ball body, and
   a gold-colored mark printed on a surface of the ball body, wherein the gold-colored mark contains:
   an epoxy resin as a base resin,
   a pigment, and
   a metal powder including particles each having a main body of copper and a copper-zinc alloy portion on a surface of the main body,
   wherein the content ratio of the powder (parts by mass) to the resin (parts by mass) is in the range of 0.15 to 5.0, and
   the content ratio of the powder (parts by mass) and the pigment (parts by mass) to the content of the resin (parts by mass) is from 0.15 to 5.0.

18. The golf ball of claim 17, wherein the content ratio of the pigment (parts by mass) to the powder (parts by mass) is not more than 0.25.

* * * * *